United States Patent [19]

Timms

[11] 3,930,009

[45] Dec. 30, 1975

[54] IMIDAZO(2,1-A)ISOINDOLES AS HYPOLIPIDEMICS

[75] Inventor: Alan R. Timms, Mendham, N.J.

[73] Assignee: Sandoz-Wander, Inc. (Sandoz, Inc.), East Hanover, N.J.

[22] Filed: June 25, 1973

[21] Appl. No.: 373,102

[52] U.S. Cl. .............................. 424/273
[51] Int. Cl.² .................... A61K 31/415
[58] Field of Search .................... 424/273

[56] References Cited
FOREIGN PATENTS OR APPLICATIONS
7,117,207  6/1972  Netherlands

OTHER PUBLICATIONS

Dolecek et al., Cas. Lek. Ces, 112, 1973, pp. 144–146.

Current Therapy, (1970), pp. 607–608.
Merck Manual, Twelfth Edition, (1972), pp. 1116–1123.
Houlihan, Chemical Abstracts, 71:112934e, (1969).
Chaykovsky et al., Chemical Abstracts, 72:121435r, (1970).
Houlihan, Chemical Abstracts, 75:20404m, (1971).

*Primary Examiner*—Norman A. Drezin
*Attorney, Agent, or Firm*—Gerald D. Sharkin; Robert S. Honor

[57] ABSTRACT

Certain known imidazo[2,1-a]isoindoles, e.g. 5-(p-chlorophenyl)-5-hydroxy-2,3-dihydro-5H-imidazo[2,1-a]isoindoles, have been found to be useful as hypolipidemic agents.

6 Claims, No Drawings

IMIDAZO(2,1-A)ISOINDOLES AS HYPOLIPIDEMICS

This invention relates to substituted imidazo[2,1-a]isoindoles. More particularly, this invention concerns the use of known substituted imidazo[2,1-a]isoindoles as hypolipidemic agents.

The active agents with which this invention is concerned may be represented by the following structural formula

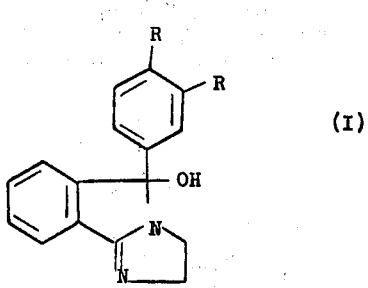

where each R, independently, represents hydrogen or halo of atomic weight about 19 to 36, or an acid addition salt thereof.

As will be appreciated by persons skilled in this art, the acid addition salt forms of the compounds (I) may actually involve a tautomeric or modified form of the above structure in salt form, but in order to simplify this description, and although both forms are intended to be included, reference will only be made in the specification and claims to the compounds (I) and salts thereof.

The compounds of formula (I) are known and may be prepared according to methods disclosed in various patents and publications in the United States and foreign countries, e.g., The Journal of Organic Chemistry, 33, No. 7, July 1968, pp. 2874–2877. The present invention contemplates only the novel use of such compounds, particularly as hypolipidemic agents in the treatment of lipidemia in mammals. The preferred compound for this use is 5-(p-chlorophenyl)-5-hydroxy-2,3-dihydro-5H-imidazo[2,1-a]isoindole.

As previously indicated, the compounds of formula (I) are useful because they possess pharmacological activity in animals. They are useful as hypolipidemic agents, particularly in reducing triglyceride levels, as indicated by noting the serum triglyceride level from male albino Wistar rats initially weighing 110–130 g. given 5–31 mg/kg of active compound. The rats are kept on drug free Purina laboratory chow for seven days and are then divided into groups of 8–10 animals. Each group (except the controls) is then fed a diet of identical chow into which active compound is mechanically ground ad. lib. for 19 days. The animals are anesthetized with sodium hexobarbital i.p., bled from the carotid arteries, and one ml. samples of serum are added to nine ml. of redistilled isopropanol. Two autoanalyzer cupsful of a mixture of zeolite-copper hydroxide and Lloydds reagent (Kessler, G., and Lederer, H. 1965, Technicon Symposium, Mediad Inc., New York 345–347) are added and agitated for one hour. After centrifugation, two ml. of the clear supernates are evaporated to dryness, saponified by addition of 0.1 ml 10% KOH in 90% ethanol and 1.0 ml Skelly B (petroleum ether bp 60°–70°). After acidification and removal of fatty acids with petroleum ether, the aqueous phases are neutralized, suitably diluted with water, and analyzed for glycerol by the method of Lofland (Anal. Biochem. 9, 393, 1964) using a Technicon Autoanalyzer. The change in serum triglyceride levels induced by the drug is computed as a percentage of the control triglyceride levels. The above-mentioned activity has also been indicated in humans having various types of hyperlipidemias administered 2–4 mg/day of compound (I) p.o. whereby triglyceride levels, total lipids and total cholesterol levels where measured using standard techniques.

For such usage, compounds (I) may be administered orally or parenterally as such or admixed with conventional pharmaceutical carriers. They may be administered orally in such forms as tablets, dispersible powders, granules, or capsules, or as oral liquids, e.g. oral liquid suspensions, syrups and elixirs, and parenterally as solutions, suspensions, dispersions, emulsions, and the like, e.g., a sterile injectable aqueous suspension. The compositions for oral use may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluents, such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques or be otherwise prepared so as to delay disintegration and absorption in the gastrointestinal tract and thereby provide a sustained action over a longer period, Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan mono-oleate) and preservatives (ethyl-p-hydroxybenzoate). Capsules may contain the active ingredient alone or admixed with an inert solid diluent, e.g., calcium carbonate, calcium phosphate and kaolin. The injectable compositions are formulated as known in the art and may contain appropriate dispersing or wetting agents and suspending agents identical or similar to those mentioned above. These pharmaceutical preparations may contain up to about 90% of the active ingredient in combination with the carrier or adjuvant.

Furthermore, the compounds of formula (I) may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, maleate, fumarate, acetate p-toluenesulfonate, and the like.

The dosage of active ingredient employed for the alleviation of lipidemia may vary depending on the particular compound employed and the severity of the condition being treated. However, in general, satisfactory results are obtained when the compounds (I) are administered orally at a daily dosage of from about 0.01 milligram to about 30 milligrams per kilogram of animal body weight, preferably given in divided doses two to four times a day, or in sustained release form. For most large mammals, the total daily dosage is from about 0.5 to about 15 milligrams. Dosage forms suitable for internal use comprise from about 0.125 to about 7.5 milligrams of the active compound in intimate admixture with a solid or liquid pharmaceutically acceptable carrier or diluent The preferred pharmaceutical compositions from the standpoint of preparation and ease of administration are tablets or capsules containing about 0.5 to 3 milligrams of active ingredient.

EXAMPLES 1 and 2

Tablets and Capsules Suitable For Oral Administration

Tablets and capsules containing the ingredients indicated below may be prepared by conventional techniques and are useful in treating lipidemia at a dose of one tablet or capsule 2 to 4 times a day.

| Ingredient | Weight (mg.) tablet | capsule |
|---|---|---|
| 5-(p-chlorophenyl)-5-hydroxy-2,3-dihydro-5H-imidazo[2,1-a]isoindole | 1 | 2 |
| tragacanth | 10 | — |
| lactose | 246.5 | 298 |
| corn starch | 25 | — |
| talcum | 15 | — |
| magnesium stearate | 2.5 | — |

EXAMPLES 3 and 4

Sterile Suspension for Injection and Oral Liquid Suspension

The following pharmaceutical compositions are formulated with the indicated amount of active agent using conventional techniques. The injectable suspension and the oral liquid suspension represent formulations useful as unit doses and may be administered in the treatment of lipidemia. The injectable suspension is suitable for administration once a day whereas the oral liquid suspension is suitably administered 2 to 4 times per day for this purpose.

The compounds 5-(3,4-dichlorophenyl)-5-hydroxy-2,3-dihydro-5H-imidazo[2,1-a]isoindole, 5-(3-fluorophenyl)-5-hydroxy-2,3-dihydro-5H-imidazo[2,1-a]isoindole, or 5-hydroxy-5-phenyl-2,3-dihydro-5H-imidazo[2,1-a]isoindole may be used in place of 5-(p-chlorophenyl)-5-hydroxy-2,3-dihydro-5H-imidazo[2,1-a]isoindole for these formulations of Examples 1–4.

What is claimed is:

1. A method for lowering elevated triglyceride levels in blood which comprises orally or parenterally administering to a mammal in need of said treatment a triglyceride lowering amount of a compound of the formula

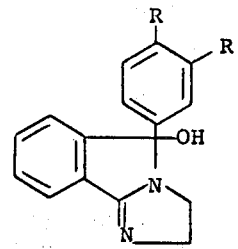

where each R, independently, represents hydrogen or halo of atomic weight about 19–36, or an acid addition salt thereof.

2. A method according to claim 1 in which the compound is 5-(p-chlorophenyl)-5-hydroxy-2,3-dihydro-5H-imidazo[2,1-a]isoindole.

3. A method according to claim 2 wherein the mode of administration is oral.

4. A method according to claim 1 wherein the compound is administered at a daily dose of from about 0.5 to about 15 mg.

5. A method according to claim 4 wherein the mode of administration is oral.

6. A method according to claim 1 wherein the compound is administered orally in a unit dosage form comprising said compound to the extent of from about 0.25 mg. to about 7.5 mg. per unit dosage.

* * * * *

| Ingredients | Weight (mg.) sterile injectable suspension | oral liquid suspension |
|---|---|---|
| 5-(p-chlorophenyl)-5-hydroxy-2,3-dihydro-5H-imidazo[2,1-a]isoindole | 10 | 2 |
| sodium carboxy methyl cellulose U.S.P. | 1.25 | 12.5 |
| methyl cellulose | 0.4 | — |
| polyvinylpyrrolidone | 5 | — |
| lecithin | 3 | — |
| benzyl alcohol | 0.01 | — |
| magnesium aluminum silicate | — | 47.5 |
| flavor | — | q.s. |
| color | — | q.s. |
| methyl paraben, U.S.P. | — | 4.5 |
| propyl paraben, U.S.P. | — | 1.0 |
| polysorbate 80 (e.g. Tween 80), U.S.P. | — | 5 |
| sorbitol solution, 70%, U.S.P. | — | 2,500 |
| buffer agent to adjust pH for desired stability | q.s. | q.s. |
| water | for injection q.s. to 1 ml. | q.s. to 5 ml. |